Aug. 8, 1961  K. A. SCHAFER ET AL  2,994,919
APPARATUS FOR MANUFACTURING PLASTIC PIPE
Original Filed April 5, 1952  3 Sheets-Sheet 1
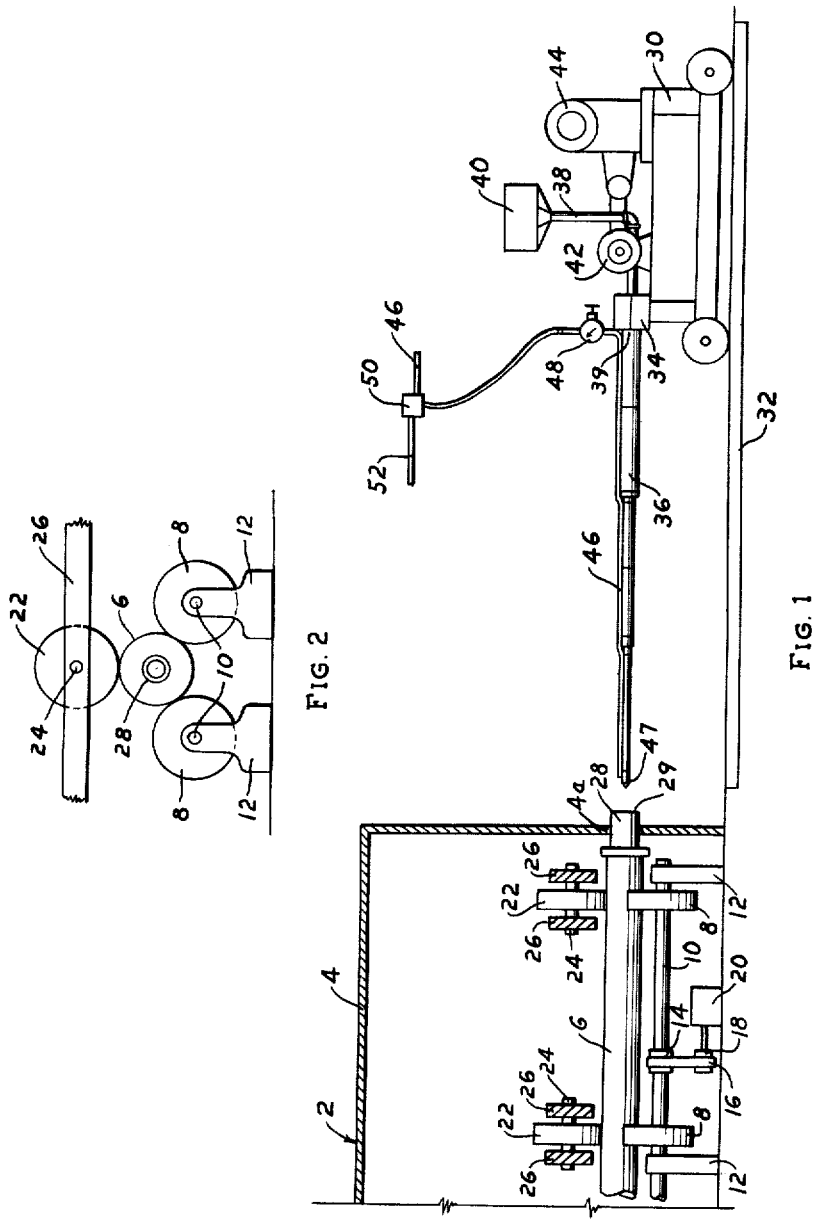
INVENTOR.
KENNETH A. SCHAFER
HERBERT D. BOGGS
BY
ATTORNEY

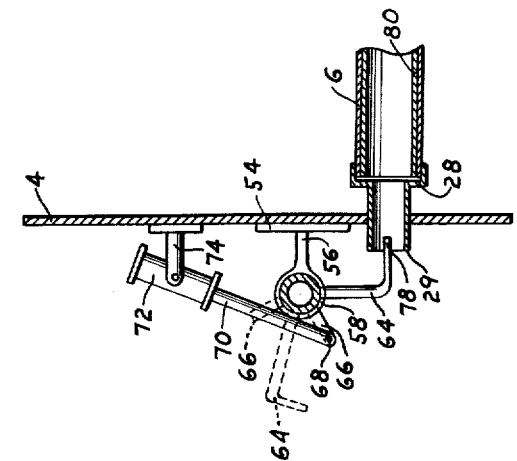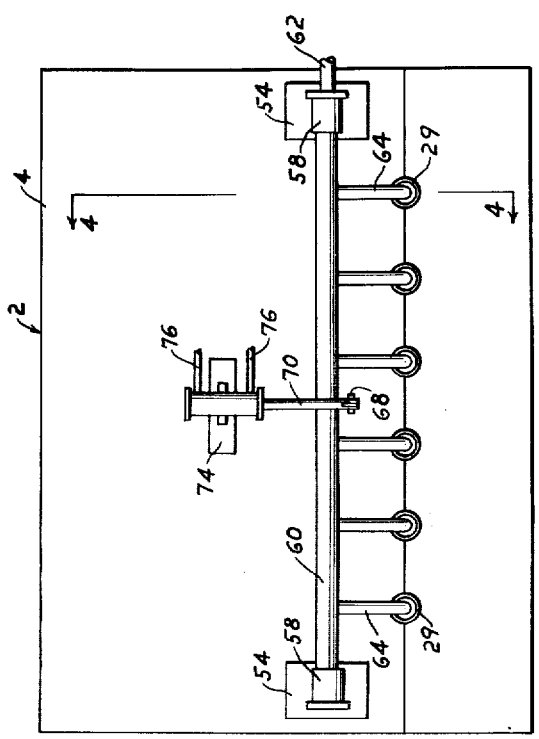

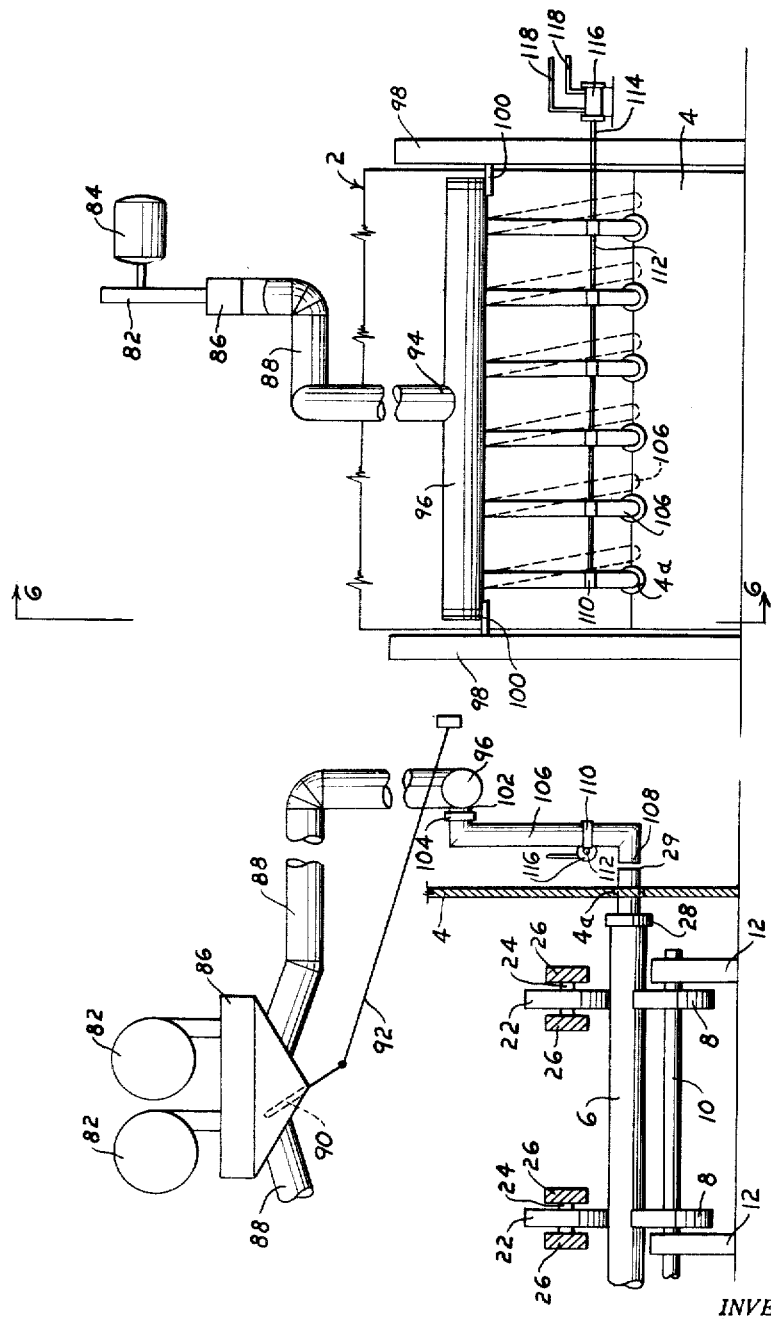

United States Patent Office 2,994,919
Patented Aug. 8, 1961

2,994,919
APPARATUS FOR MANUFACTURING PLASTIC PIPE
Kenneth A. Schafer, Glenshaw, Pa., and Herbert D. Boggs, Tulsa, Okla., assignors to H. D. Boggs Company, Ltd., Omaha, Nebr., a limited partnership
Original application Apr. 5, 1952, Ser. No. 280,766. Divided and this application June 6, 1957, Ser. No. 664,019
5 Claims. (Cl. 18—26)

This invention relates generally to improvements in the art of forming plastic pipes and the like, and more particularly, but not by way of limitation, to apparatus for removing the exothermic heat from a plastic pipe during the curing thereof. This invention is an improvement on the co-pending application of Herbert D. Boggs, entitled "Pipe Forming Machine and Method," filed December 11, 1950, Serial Number 200,193, now Patent No. 2,776,450.

This application is a division of the co-pending application of Kenneth A. Schafer, Serial No. 280,766, filed April 5, 1952, for "Method of Manufacturing Plastic Pipe," now abandoned.

In the manufacturing of re-enforced plastic pipe, and as shown in the above mentioned co-pending application, a mat of fibrous material or the like is first inserted into a tubular mold and placed against the inner walls thereof. The mold is then placed in rotation, whereupon, liquid resin is injected into the mold and is centrifuged into the fibrous material. The mold is continued rotating and heat is applied to the mold to cause an impregnation of the fibrous mat with the liquid resin and to cure the resin. In one method of manufacture, a second volume of liquid resin is injected into the mold when the resin previously injected into the mold begins to solidify. The second volume of resin forms an inner coat or layer which is substantially void of any fibers of the mat for re-enforcement. Thus, the second coat of resin provides a smooth and glossy finish along the inner surface of the finished plastic pipe.

The heat is still applied after the second coat of resin is injected into the pipe mold and the mold is continued rotating until the process of exotherm occurs. As it is well known in the art, exotherm is the action of the plastic giving off its own heat when the conditions for reaction (cure) have been established. The temperature attained by the process of exotherm is above the desired temperature for producing a satisfactory glass re-enforced plastic product. As a result, the inner coat of resin, which is not re-enforced by the fibrous mat, frequently cracks to interrupt the smooth inner surface of the pipe.

The present invention contemplates apparatus for controlling the temperature of the resin when the process of exotherm occurs. Broadly stated, the temperature is controlled by blowing air, or any other inert gas, at a controlled volume and temperature through the inside of the rotating mold during the curing process. The air thus blown through the mold absorbs and removes the excessive heat given off by the curing resin.

An important object of this invention is to preclude the cracking of the inner coat of resin in a laminated plastic pipe.

Another object of this invention is to provide novel apparatus for controlling the temperature of plastic pipe during the curing thereof.

A further object of this invention is to provide an apparatus for removing the exothermic heat from a plastic pipe which may be economically manufactured.

Other objects and advantages of the invention will be evident from the following detailed description, read in conjunction with the accompanying drawings, which illustrate our invention.

In the drawings:
FIGURE 1 is a side elevational view, partially in section, of one end of a plastic pipe forming machine with means for injecting air into the pipe molds.
FIGURE 2 is a partial end elevational view of the pipe forming machine shown in FIG. 1 with the housing of the machine removed illustrating the means for rotating a plastic pipe mold.
FIGURE 3 is an end elevational view of the plastic pipe forming machine shown in FIG. 1 with a modified apparatus for injecting air into the pipe molds.
FIGURE 4 is a sectional view taken along lines 4—4 of FIG. 3.
FIGURE 5 is an end elevational view of the plastic pipe forming machine utilizing still another modified apparatus for injecting air into the pipe molds.
FIGURE 6 is a sectional view taken along lines 6—6 of FIG. 5.

Referring to the drawings in detail, and particularly FIG. 1, reference character 2 generally designates a plastic pipe forming machine, only one end portion of which is shown. The machine 2 is provided with a housing 4 for receiving a plurality of pipe molds 6 (only one of which is shown). Each of the pipe molds 6 is disposed on spaced sets or pairs of support rollers 8 (see also FIG. 2). The rollers 8 are rigidly secured on shafts 10 disposed longitudinally in the housing 4 in parallel relation to the pipe mold 6. The shafts 10 are in turn rotatably supported by spaced bearing members 12. One of the shafts 10 is provided with a sheave 14 for receiving a belt 16. The belt 16 extends from the sheave 14 over a complementary sheave 18, which is adapted to be driven by a suitable motor 20. It will be apparent, therefore, that the motor 20 drives one of the shafts 10 to rotate one of the rollers 8 in each set, which in turn rotates the pipe mold 6. The opposite rollers 8 merely idle to support and permit rotation of the pipe mold 6.

A hold-down roller 24 contacts the crown of each pipe mold 6 above each set of the rollers 8. Each hold-down roller 22 is rotatably supported on a pin 24 between a pair of transversely extending arms 26. The arms 26 are adjustably supported in the housing 4 in any suitable manner (not shown) to retain the hold-down rollers 22 in contact with the crown of the pipe mold 6 during rotation thereof. A tubular cap or extension 28 is provided on each end of each pipe mold 6 and extends through a complementary aperture 4a in the housing 4. Bearings (not shown) may be provided in the housing 4 to receive the caps 28, if desired. The outer end 29 of each cap 28 is open for purposes as will be hereinafter set forth.

A wheeled cart 30 (only one of which is shown) is supported on suitable spaced tracks 32 at each end of the housing 4 in axial alignment with the pipe mold 6. Each cart 30 is provided with a bracket 34 for supporting an impregnator tube 36 in the manner of a cantilever in a position opposite the pipe mold 6. A conduit 38 provides communication between the outer end 39 of the impregnator tube 36 and a suitable container 40. The container 40 is provided to retain a supply of liquid resin for injection into the pipe mold 6, as will be hereinafter set forth. A pump 42 is interposed in the conduit 38 to pump the liquid resin from the container 40 through the conduit 38 and impregnator tube 36. The pump 42 is driven by a suitable prime mover 44.

An air hose or conduit 46 is secured to the impregnator tube 36 and communicates with a source of high pressure air (not shown). The conduit 46 extends along the tube 36 and terminates adjacent the end 47 thereof. A pressure regulator 48 is interposed in the air hose 46 adjacent the cart 30 to control the pressure of air flowing through the hose 46. A solenoid operated valve 50 is also interposed in the air hose 46 upstream of the pressure regulator 48. The valve 50 is preferably secured to any stationary structure (not shown) adjacent the pipe forming machine 2. Therefore, the portion of the hose 46 between the valve 50 and the pressure regulator 48 must be flexible to permit movement of the cart 30. An electrical conduit 52 provides communication between the solenoid operated valve 50 and any suitable control mechanism (not shown) to provide for opening and closing the valve 50 and controlling the discharge of air through the air hose 46.

Operation

To form a plastic pipe by use of the apparatus shown in FIGS. 1 and 2, a suitable fiber mat (not shown) is first inserted in the pipe mold 6 and placed in contact with the inner surface thereof. The caps 28 are then placed on the opposite ends of the pipe mold 6 and the mold is placed in the housing 4 in the position shown in FIG. 1. The drive motor 20 is then placed in operation to rotate the driving group of the support rollers 8 and provide rotation of the pipe mold 6.

When the pipe mold is rotating at the desired speed, the carts 30 are moved toward the opposite ends of the housing 4 to insert the impregnator tubes 36 into the pipe mold 6. It will be apparent, that since two of the impregnator tubes 36 are provided, each of the tubes 36 will be moved substantially half way through the pipe mold 6. When the impregnator tubes have reached the central portion of the mold 6, the direction of movement of the carts 30 is reversed to withdraw the impregnator tubes 36 from the mold 6. As the withdrawing movement of the tubes 36 is begun, the prime movers 44 are placed in operation to drive the pumps 42 and pump the liquid resin from the containers 40 through the conduits 38 and impregnator tubes 36. The resin is discharged from the outer end 47 of each impregnator tube 36, and is forced outwardly by the rotating action of the mold 6 to impregnate the fiber mat. The injection of resin into the pipe mold 6 is continued as the impregnator tubes 36 are withdrawn to distribute the resin over the entire length of the mold 6. When the ends 47 of the tubes 36 are adjacent the caps 28, the prime movers 44 and pumps 42 are stopped to cut off the flow of the liquid resin.

The pipe mold 6 is continued rotating and heat is applied thereto in any suitable manner, such as by gas burners (not shown) extending underneath the mold 6 between the rollers 8. The heat thus applied provides a curing of the liquid resin which has been impregnated into the fiber mat. As the first coat of resin begins to solidify, the impregnator tubes 36 are again moved into the pipe mold 6 where a similar injection of liquid resin is provided. The second coat of liquid resin is, of course, applied to the inner surface of the first coat and only partially penetrates the fiber mat. Thus, the greater portion of the second coat is not re-enforced in any manner.

Heat is continuously applied and the mold 6 is continued rotating after the second coat of resin is injected into the mold 6 to provide a curing and bonding of both coats of the resin. After a brief period, the process of exotherm sets in to provide an excessive amount of heat for the curing of the resin. At this time, the solenoid operated valves 50 are opened to provide a flow of air through the air hoses 46. The impregnator tubes 36 are then continuously moved in and out of the mold 6 to blow the air therethrough. The air thus injected into the mold 6 absorbs the excessisve heat and is discharged out the same end of the mold 6 in which it was injected, due to the joint action of the air hoses 46. The cool air is, therefore, distributed over the entire length of the mold 6 to provide a uniform cooling action. When the resin is completely cured and has been solified into tubular form, the carts 30 are withdrawn to the position shown in FIG. 1, and the valves 50 are closed to cut off the discharge of air through the air hoses 46. The molds 6 are then removed from the housing 4 to permit removal of the plastic pipe therefrom in any suitable manner.

The conditions which dictate the volume and temperature of the air to be blown through the mold 6 are, in general, the size of the mold, the type of resin and the type of catalyst used. It will be apparent to those skilled in the art that both the volume and the temperature of the air will vary considerably, depending upon the above conditions. For example, the volume of air blown through a four inch mold will vary between five and twenty thousand cubic feet per hour, while the temperature thereof may vary between fifty and two hundred degrees Fahrenheit.

FIGURES 3 and 4 illustrate a modified apparatus for injecting air into the pipe molds 6. A pair of brackets 54 are secured in spaced relation on each end of the pipe forming machine housing 4. Each bracket 54 is provided with an outwardly extending arm 56 having a sleeve type bearing 58 on the outer end thereof. The bearings 58 are provided to receive and rotatably support the opposite ends of an air header 60 extending traversely across each end of the housing 4 above the pipe molds 6. A conduit 62 provides communication between each air header 60 and any suitable source of high pressure air (not shown). The conduits 62 must either be flexible or have a swivel (not shown) interposed therein to permit rotation of the headers 60. An L-shaped nozzle 64 extends downwardly from the air headers 60 adjacent each end of each of the pipe molds 6. The nozzles 64 communicate with the air headers 60 to direct air into the opposite ends of the pipe molds 6, as will be more fully hereinafter set forth.

An arm 66 is secured to the central portion of each air header 60 and extends outwardly therefrom at an oblique angle. The outer end of each arm 66 is pivotally secured by a pin 68 to the lower end of a shaft 70. Each shaft 70 extends upwardly into a cylinder 72 pivotally supported by brackets 74 to the respective end of the housing 4. A suitable plunger (not shown) is provided on each of the shafts 70 within the respective cylinder 72 to control operation of the shafts 70. The plungers are moved in their respective cylinders 72 by air pressure or the like supplied to the cylinder by means of conduits 76. The conduits 76 provide communication between the opposite ends of each cylinder 72 and any suitable control mechanism (not shown).

The process of forming plastic pipes with the apparatus shown in FIGS. 3 and 4 is the same as that heretofore set forth in the discussion relative to FIGS. 1 and 2 through the steps of injecting the second coat of resin into the molds 6. During the injection of the resin into the molds 6, air is supplied through the lower conduits 76 into the lower ends of the cylinders 72 to move the shafts 70 upwardly and rotate the air headers 60. In this position of the air headers 60, the nozzles 64 will be disposed above the pipe molds 6 as shown in dotted lines in FIG. 4 to permit the insertion and withdrawal of the impregnator tubes 36 into the molds 6.

After the second coat of resin has been injected into the pipe molds 6 and begins to solidify, air is directed through the upper conduits 76 into the respective cylinders 72 to move the shafts 70 downwardly. The air headers 60 are thus rotated to move the nozzles 64 into the positions shown in full lines in FIGS. 3 and 4. It will be noted that in this position of the nozzles 64, the outer end 78 of each nozzle is inserted in the outer end 29 of the respective pipe mold cap 28. Air is then blown through one of the headers 60 and its respective nozzles 64 into the pipe molds 6, and alternately through the opposite air header 60 and nozzles 64 into the opposite end of the pipe molds 6. Air is thus blown alternately into one end of each pipe mold 6 and then into the other end at intervals of from thirty seconds to fifteen minutes, depending upon the relative temperature of the air and the molds. It will be apparent that the air will become heated as it flows through the pipe molds 6; and by the time the air reaches the far end of the respective pipe mold 6, it will be heated to such a temperature that it will no longer act as a cooling agent. Therefore, the air is blown alternately into the opposite ends of the pipe molds 6 as set forth above. Cracking of the inner surface of the plastic pipe 80 is thus precluded to provide a smooth finished and strong pipe.

FIGURES 5 and 6 disclose still another apparatus for blowing air through the pipe molds 6. Reference character 82 designates a pair of blowers supported in any suitable manner (not shown) above the housing 4. Each blower 82 is operated by a motor 84. The discharge side of each blower 82 communicates with a wind box 86 also disposed above the housing 4. A pair of conduits 88 communicate with the opposite sides of the wind box 86 and extend to the opposite ends (only one of which is shown) of the housing 4. A butterfly valve 90 is pivotally supported in the wind box 86 and is adapted to be actuated by suitable linkage 92 to alternately close off the opposite conduits 88, as will be more fully hereinafter set forth. The lower end 94 of each conduit 88 communicates with a header 96 extending traversely across the respective end of the housing 4. Each header 96 is supported by stanchions 98 through the medium of brackets 100.

An outlet 102 is provided in each of the headers 96 substantially in alignment with each of the pipe molds 6. Each outlet 102 is interconnected by means of a swivel 104 with a downwardly extending conduit 106. The conduits 106 extend downwardly to a position opposite the pipe molds 6 and are then bent inwardly toward the caps 28 to provide a discharge of air into the opposite ends of the pipe molds 6, as will be hereinafter set forth. The lower end 108 of each conduit 106 is adapted to be positioned adjacent the outer open end 29 of the respective pipe mold cap 28.

A band or ring 110 is secured around each of the conduits 106 in proximity with the lower end 108 thereof. A shaft 112 extends transversely across each end of the housing 4 and is pivotally connected in any suitable manner (not shown) to each of the respective bands 110. It will be apparent that upon transverse movement of the shafts 112, the conduits 106 will be pivoted in the swivel joints 104. The outer end 114 of each shaft 112 extends into an air cylinder 116. A plunger (not shown) is provided on the outer end 114 of each shaft 112 and is adapted to be reciprocated in the respective cylinder 116 to provide operation of the shafts 112. Air conduits 118 provide communication between the opposite ends of each cylinder 116 and a suitable control mechanism (not shown) to supply air to the cylinders 116 and provide movement of the shafts 112.

In operation of the apparatus shown in FIGS. 5 and 6, air is initially supplied through the left hand conduits 118 to move the shafts 112 to the right. The shafts 112 thus pivot the air conduits 106 to the positions shown in dotted lines in FIG. 5 to remove the conduits 106 from the opposite ends of the pipe molds 6. The impregnator tubes 36 may then be inserted and withdrawn from the pipe molds 6 to inject the liquid resin therein in the same manner as set forth above relative to FIGS. 1 and 2.

When the second coat of resin has been injected, air is supplied through the right hand conduits 18 to move the shafts 112 to the left and position the conduits 102 as shown in full lines in FIGS. 5 and 6. The blowers 82 are then placed in operation and the butterfly valve 90 is positioned over one of the conduits 86. The air provided by the blowers 82 is thus forced through the opposite conduit 88, header 96 and air conduits 106 into one end of the pipe molds 6. At intervals the linkage 92 is actuated to reverse the position of the butterfly valve 90. The air moved by the blowers 82 is then forced into the opposite ends of the pipe molds 6. It will be apparent that this apparatus operates in substantially the same manner as the apparatus shown in FIGS. 3 and 4 to provide a flow of air first in one direction and then in the opposite direction through the pipe molds 6. The apparatus shown in FIGS. 5 and 6 is adapted to provide a larger volume of air than the apparatus shown in FIGS. 3 and 4 and is, therefore, preferably utilized when forming large plastic pipes.

From the foregoing, it is apparent that the present invention provides a novel method of manufacturing multiple layer plastic pipe. The exothermic heat given off by the plastic during the curing operation is effectively removed to control the temperature of the curing plastic and prevent cracking thereof.

Although we have described the manufacturing operation as involving two resin injections, it is to be understood that air can be beneficially used in the same manner as set forth above when plastic pipe is formed with only one coat or injection of resin. Furthermore, we have selected air as the cooling medium in the foregoing description, however, any other inert gas may be used with equivalent results.

Changes may be made in the combination and arrangement of parts as heretofore set forth in the specification and shown in the drawings, it being understood that any modification in the precise embodiment of the invention may be made within the scope of the following claims without departing from the spirit of the invention.

We claim:

1. Apparatus for dispelling the exotherm heats generated by reactions occurring within an open ended pipe casting mold being spun on its longitudinal axis comprising: means for injecting a cooling gaseous medium into a first end of the mold; means for injecting the cooling gaseous medium into a second end of the mold; duct means extending to each of said injecting means and communicating with a source of pressurized gaseous medium; means for alternately moving each of said injecting means from a first or stand-by position which is clear of the longitudinal axis of the mold, and hence leaves a clear path for access to that end of the mold, to a second or operative position for injecting the cooling gaseous medium into the lumen of the mold, the arrangement being such that the injecting means are always free of any contact with the mold that would interfere with the spinning thereof; valve means, connected with said duct means; and valve actuating means; said valve means so controlling the flow of pressurized gaseous cooling medium as to only supply the same to an injecting means which is disposed in the second or operative position.

2. The structure defined in claim 1 and further including means to move both injecting means to a stand-by position when the mold is to be loaded, unloaded, or otherwise serviced.

3. The apparatus defined in claim 2, wherein the duct means comprises headers located at each end of the mold and which extend transversely of the mold at a level spaced from the longitudinal axis thereof; means for supporting each said headers for rotatable movement about a longitudinal axis thereof; each of said injecting means comprising a nozzle communicating with one of said headers and fixed thereto in the same vertical plane as the axis of the mold; said means for alternately moving each of said injecting means from one position to the other comprising means for rotating the headers to bring the free end of the nozzles into a position on the longitudinal axis of the mold closely adjacent the open end thereof, and to bring the nozzles to a position which is clear of the bore of the mold.

4. The apparatus defined in claim 2, wherein the duct means comprises headers located at each end of the mold and which extend transversely of the mold at a level spaced from the longitudinal axis thereof; an outlet in each of said headers substantially in alignment with the respective ends of the mold; said injecting means comprising a conduit pivotally secured to one of said outlets for arcuate movement transversely of the mold in a plane located beyond the corresponding end of the mold, said conduit having a free end pointing towards the mold, said conduit being so dimensioned that the free end will be directly opposite the corresponding open end of the mold during one portion of its arcuate movement, and will be clear of the open end of the mold during other portions of its arcuate movement.

5. An apparatus as set forth in claim 3, wherein the means for turning the headers comprises a control cylinder pivotally secured at each end of the mold in a position to extend transversely to the longitudinal axis of the respective header, a plunger reciprocally disposed in each cylinder, a shaft extending from each plunger toward the respective header, an arm rigidly secured to each header and pivotally secured to the outer end of the respective shaft, and means for introducing fluid into the opposite ends of each cylinder to move the respective plunger and turn the respective header.

References Cited in the file of this patent

UNITED STATES PATENTS

| | | |
|---|---|---|
| 1,318,520 | Wolever | Oct. 14, 1919 |
| 1,480,000 | McWane | Jan. 8, 1924 |
| 1,577,531 | Lambert et al. | Mar. 23, 1926 |
| 1,668,763 | Dickson | May 8, 1928 |
| 1,840,027 | Fetter | Jan. 5, 1932 |
| 1,942,840 | Sheppard et al. | Jan. 9, 1934 |
| 2,230,190 | Ferngren | Jan. 28, 1941 |
| 2,280,636 | Kraft | Apr. 21, 1942 |
| 2,290,129 | Moreland | July 14, 1942 |
| 2,696,637 | McDermott | Dec. 14, 1954 |
| 2,776,450 | Boggs | Jan. 8, 1957 |